June 16, 1942.　　　L. A. LEHRMAN　　　2,286,631
SNUBBER
Filed Aug. 1, 1939　　　2 Sheets-Sheet 1
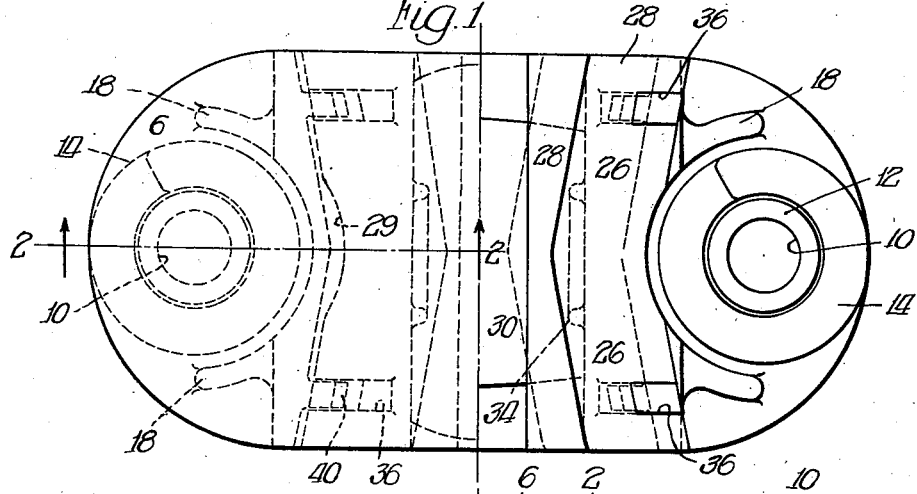
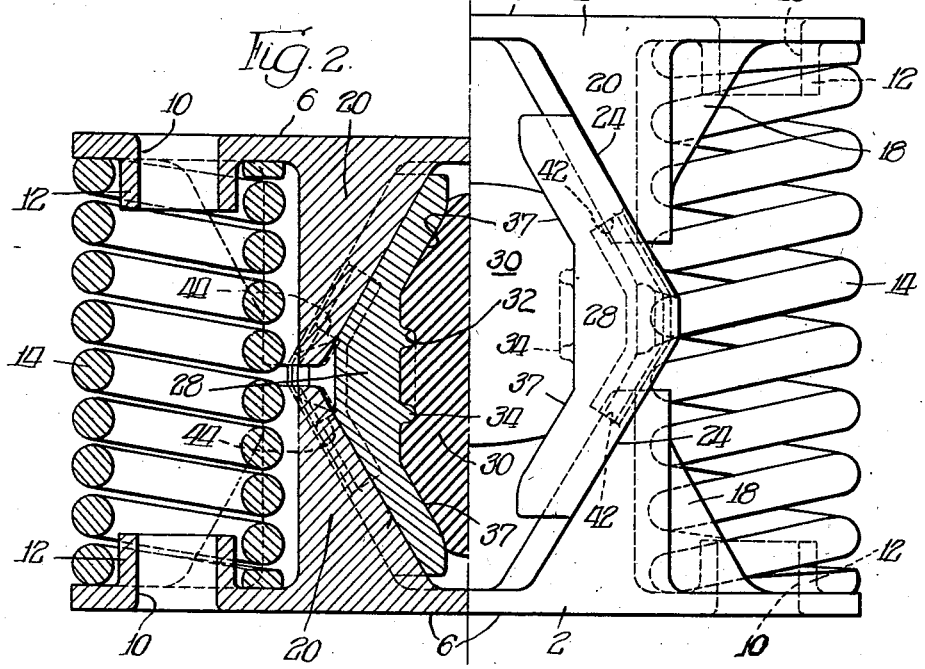
INVENTOR.
Leo A. Lehrman,
BY
ATTORNEY.

June 16, 1942.　　　L. A. LEHRMAN　　　2,286,631
SNUBBER
Filed Aug. 1, 1939　　　2 Sheets-Sheet 2
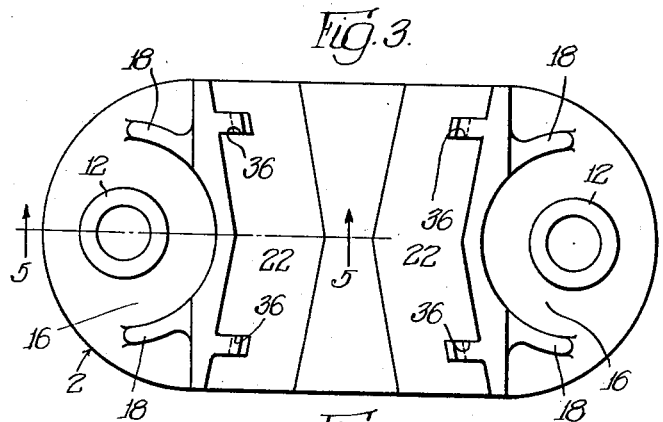
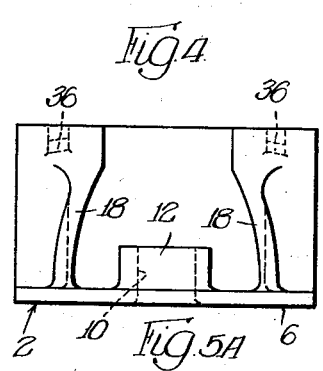
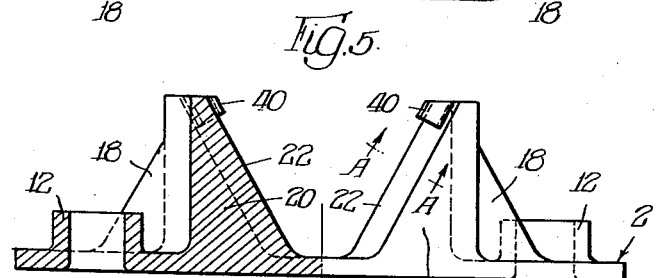
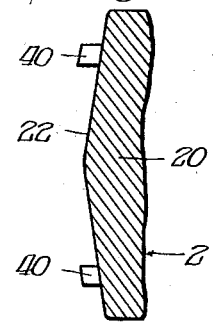
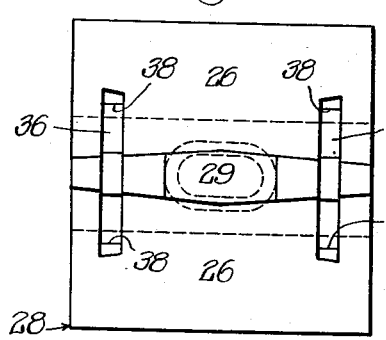
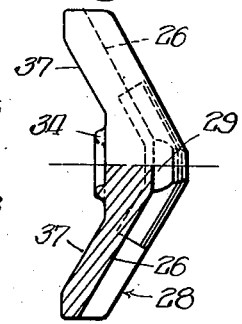
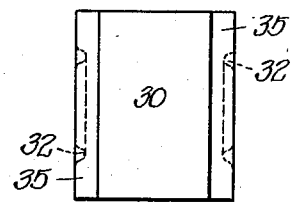
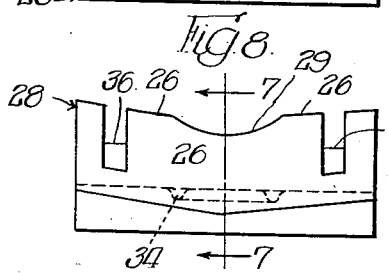
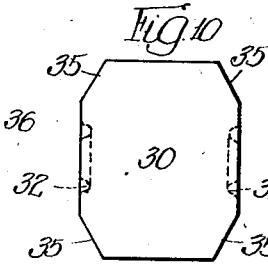
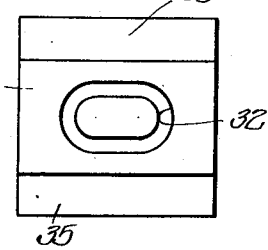
INVENTOR.
Leo A. Lehrman,
BY
ATTORNEY.

Patented June 16, 1942

2,286,631

UNITED STATES PATENT OFFICE 2,286,631

SNUBBER

Leo A. Lehrman, Chicago, Ill., assignor to American Steel Foundries, Chicago, Ill., a corporation of New Jersey Application August 1, 1939, Serial No. 287,792

28 Claims. (Cl. 267—9)

My invention relates to a friction absorbing device or snubber particularly for use on railway equipment. The form shown contemplates use in a railway car truck with spring groups of present standard arrangements. It will readily be understood, however, that my novel arrangement may be accommodated for use in any situation requiring the absorption of friction by modification of the size of the device or the angles involved in the wearing surfaces or both.

An object of my invention is to design a friction absorbing device particularly suitable for use in railway equipment.

A further object is a form of friction absorbing device wherein the parts will be sturdier and heavier than is commonly the case with snubbers used in spring groups under railway equipment. For that reason I have shown a design which is suitable to replace two coil springs rather than one as is a common practice.

My invention contemplates such a friction absorbing device as above described wherein only two forms of friction elements are required, each of which is used in duplicate, thus reducing to a minimum the cost of producing parts.

My invention also comprehends such a device wherein the friction elements are held in interlocked relationship after assembly, maintaining the parts in relationship to each other as an assembled unit.

Figure 1 is a plan view of my novel form of friction absorbing device, the left half of the figure showing the top plan thereof and the right half showing a top plan with certain parts removed.

Figure 2 is an elevation view half in section, the right half showing a side elevation of the structure in its normal expanded position and the left half thereof showing a sectional view in the vertical plane on the long axis thereof with the device in compressed position and substantially in the plane indicated by the line 2—2 of Figure 1.

Figure 3 is a plan view from the friction side of the combined follower wedge and spring cap; Figure 4 is an end elevation thereof; and Figure 5 is a side elevation thereof, half in section, the section being taken in the plane bisecting the device on its long axis and substantially as indicated by the line 5—5 of Figure 3. Figure 5A is a sectional view through the friction surface of the follower wedge taken substantially in the plane indicated by the line A—A of Figure 5.

Figure 6 is a plan view from the friction side of my novel form of side wedge.

Figure 7 is a side elevation, half in section, of my novel form of side wedge, the section being taken substantially in the plane indicated by the line 7—7 of Figure 8.

Figure 8 is an end view of the side wedge.

Figure 9 is a top plan view of my novel form of resilient member interposed between the side wedges; Figure 10 is a side elevation thereof, and Figure 11 is an end elevation.

Describing the structure in detail and referring particularly to the assembled unit as shown in Figures 1 and 2, the device comprises identical top and bottom followers 2, 2 presenting on their outer faces flat surfaces as at 6, 6 serving as seating means for the device, said flat surfaces being interrupted by the openings 10, 10 formed adjacent opposite ends of each follower on the long axis thereof. The said openings 10, 10 provide means for positioning the device, being defined by the inwardly projecting annular flanges 12, 12 forming positioning means for the end coil springs 14, 14 said springs being positioned at opposite ends of the device with their upper and lower ends in abutment with the inner faces of said followers against the spring seats 16, 16 (Figure 3) formed around said annular flanges. Partially housing the ends of each spring are the tapering arcuate flanges 18, 18, said flanges serving also as reinforcements for the opposed pedestals 20, 20 formed adjacent the opposite ends of each follower. On the inner faces of the pedestals 20, 20 are formed wedge-shaped friction surfaces 22, 22 having sliding frictional engagement as at 24, 24 with the shallow V-shaped friction surfaces 26, 26 (Figures 6 and 8) formed on the outwardly directed faces of the wedge blocks or friction shoes 28, 28. Each friction shoe 28 is relieved centrally thereof as at 29 (Figure 8) to accommodate the adjacent coil spring 14. Between the wedge blocks at opposite ends of the device is positioned the compression spring 30 formed of resilient rubber-like material, said spring presenting on its opposite ends the annular slots 32, 32 receiving the annular ribs 34, 34 on the inner faces of the wedge blocks 28. The resilient member 30 is chamfered at its opposite ends as indicated at 35, 35 (Figure 10) to accommodate its seating as at 37, 37 (Figure 2) against the inner face of the wedge block or friction shoe 28. Adjacent the lateral edges of each friction shoe 28 are formed the vertical slots 36, 36 having adjacent their opposite ends the shoulders 38, 38 (Figure 6), said slots receiving the interlocking lugs 40, 40 (Figure 5A) formed at the lateral edges of the pedestals 20, 20, said lugs having abutment against the shoulders 38, 38 as best seen at 42, 42 (Figure 2) when said device is in its expanded or normal assembled position. As the device is compressed the said lugs 40, 40 may slide down the slots 36, 36 to the positions shown at 44, 44 in the sectional view of Figure 2. Abutment of the lugs 40 with the shoulders 38 thus acts to retain the parts in assembled relationship. In the assembling operation the various parts will be placed in position on the bottom follower and thereafter the top follower will be forced into its proper position until the lugs 40 have snapped into the slots 36 after which the device may be handled as a unit.

It may be noted that my novel arrangement affords in the friction shoes 28, 28 and the pedestals 20, 20 heavy blocks of metal which may be afforded such size as to provide wearing surfaces capable of long life and thus affording efficient friction absorbing capacity for the device over a long period of time.

The operation of the device is simple as will be apparent to those skilled in the art; the friction surfaces are of large areas and therefore long wearing; and the parts are relatively simple and only two forms of friction members are used so that the complete device consists solely of two each of such friction elements, two coil springs and a resilient member, preferably of rubber composition although my invention contemplates any suitable resilient member positioned between the friction shoes in a device of this form.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, top and bottom followers each having a plurality of pedestals with inwardly directed friction surfaces, a pair of coil springs supported between said followers outwardly of said pedestals, friction shoes having engagement with said friction surfaces, a resilient pad supported in compression between said friction shoes and having tapering faces in engagement therewith, and interlocking means on said shoes engaging means on pedestals associated with respective followers to retain said parts in assembled relationship.

2. A friction absorbing device having identical top and bottom followers, a pair of coil springs between said followers, each of said followers presenting diagonally arranged inwardly directed friction surfaces, a plurality of friction shoes interposed between said followers, a resilient member compressed between said friction shoes, and laterally spaced slots on each of said shoes engaging members on a pedestal associated with each of said followers to interlock the parts of said device against accidental dismantling.

3. In a friction absorbing device, top and bottom followers each having a plurality of pedestals with V-shaped inwardly directed friction faces, a pair of coil springs supported between said followers outwardly of said pedestals, friction shoes having engagement with said friction faces, a resilient pad supported in compression between said friction shoes and having diagonally arranged faces seated thereagainst serving with said V-shaped faces to position said shoes, and interlocking means on said shoes engaging means on said pedestals to retain said parts in assembled relationship.

4. In a friction absorbing device, top and bottom followers having inwardly projecting pedestals with V-shaped tapering friction surfaces, a pair of coil springs supported between said followers, wedge shoes having complementary friction faces in engagement with said surfaces, a resilient member in compression between said wedge shoes and having tapered faces seated thereagainst, and means on each of said shoes engaging means on pedestals associated with each of said followers to retain said device in assembled relationship.

5. A friction absorbing device having opposed similar followers, coil springs therebetween, each of said followers presenting inwardly directed diagonally arranged friction surfaces, wedge shoes having complementary friction faces seated against said surfaces, a resilient member interposed between said wedge shoes, slots on each of said shoes, and means on pedestals associated with each of said followers received in said slots to retain said device in assembled relationship.

6. In a friction absorbing device, top and bottom followers having inwardly projecting pedestals with V-shaped tapering friction surfaces, coil springs supported between said followers, wedge shoes having complementary friction faces in engagement with said surfaces, a resilient member in compression between said wedge shoes, and lugs on said pedestals slidably received in slots in said shoes to retain said device in assembled relationship.

7. A friction absorbing device having identical top and bottom followers, coil springs between said followers, each of said followers presenting diagonally arranged inwardly directed friction surfaces, a plurality of friction shoes interposed between said followers, resilient means compressed between said friction shoes, and lugs on said followers engaging slots on said shoes to retain the parts of said device in assembled relationship.

8. A friction absorbing device having identical top and bottom followers each presenting a plurality of inwardly directed pedestals, coil springs interposed between said followers outwardly of said pedestals, diagonally arranged friction surfaces on the inner faces of said pedestals, wedge shoes having complementary friction surfaces in engagement with said faces, a resilient member interposed between said wedge shoes, and means positioning said shoes comprising tapering faces on said member abutting said shoes.

9. A friction absorbing device having opposed similar followers, coil springs therebetween, said followers presenting inwardly directed diagonally arranged friction surfaces, wedge shoes having complementary friction faces seated against said surfaces, and a resilient member interposed between said wedge shoes, each of said shoes having laterally spaced slots engaging each of said followers to retain the parts of said device in assembled relationship.

10. A friction absorbing device having identical top and bottom followers, coil springs between said followers, each of said followers presenting diagonally arranged inwardly directed friction surfaces, a plurality of friction shoes interposed between said followers, a resilient member compressed between said friction shoes, and means on said shoes adjacent their lateral edges accommodating lugs on said followers to retain said device in assembled relationship.

11. A frictional stabilizing device having top and bottom followers with wedge shaped friction surfaces, floating transverse wedge shoes coacting with said followers, a resilient member between said shoes for urging them into frictional engagement with said surfaces, resilient means between said followers outwardly of their friction surfaces, and laterally spaced tongue and groove means on each wedge shoe and on said surfaces for maintaining the device in assembly.

12. In a friction absorbing device, top and bottom followers having inwardly projecting pedestals with V-shaped tapering friction surfaces, coil springs supported between said followers, wedge shoes having complementary friction faces in engagement with said surfaces, a resilient member in compression between said wedge shoes, and cooperating means interrupting said surfaces on said pedestals and said faces on said shoes to retain said device in assembly.

13. In a friction absorbing device, top and bottom followers each having a plurality of pedestals with inwardly directed friction surfaces, coil springs supported between said followers outwardly of said pedestals, friction shoes having engagement with said friction surfaces, and a resilient pad with chamfered ends abutting said shoes and supported in compression therebetween.

14. In a friction absorbing device, top and bottom followers having inwardly projecting pedestals with V-shaped tapering friction surfaces, coil springs supported between said followers, wedge shoes having complementary friction faces in engagement with said surfaces, and a resilient member in compression between said wedge shoes and having diagonally arranged faces seated thereagainst.

15. A friction absorbing device having identical top and bottom followers, coil springs between said followers, each of said followers presenting diagonally arranged inwardly directed friction surfaces, a plurality of friction shoes interposed between said followers, a resilient member compressed between said friction shoes, and positioning means comprising engaging means on said member and said shoes and tapering ends on said member in abutment thereagainst.

16. In a friction absorbing device, a follower presenting tapering pedestals with inwardly directed friction faces and spring positioning means outwardly of said pedestals, each of said pedestals having adjacent its free end a member interrupting a friction face and forming a means of interlocking said pedestals with an associated friction wedge.

17. A friction absorbing device having opposed similar followers, coil springs therebetween, said followers presenting inwardly directed diagonally arranged friction surfaces, wedge shoes having complementary friction faces seated against said surfaces, and a resilient member interposed between said wedge shoes and having tapered ends seated thereagainst.

18. In a friction absorbing device, a follower having a plurality of pedestals presenting diagonally arranged inwardly directed friction surfaces, and positioning means for coil springs outwardly thereof, each of said pedestals having laterally spaced members on said surfaces for interlocking engagement with an associated friction shoe.

19. In a friction absorbing device, a follower having a plurality of pedestals presenting diagonally arranged inwardly directed V-shaped friction surfaces, and positioning means for said device and for coil springs outwardly thereof, said V-shaped friction surfaces affording positioning means for associated friction shoes.

20. In a friction absorbing device, a follower presenting tapering pedestals with inwardly directed V-shaped friction faces and means outwardly of said pedestals positioning said device and associated coil springs.

21. In a fraction energy absorbing device, spaced compression springs, end followers affording positioning means therefor and having inwardly projecting pedestals with V-shaped tapering friction surfaces between said springs, wedge shoes with faces in complementary engagement with said surfaces, a resilient pad compressed between said shoes and having tapered ends in abutment therewith, and projecting members on said pedestals cooperating with recessed means on said shoes to retain said device in assembly.

22. In a friction energy absorbing device, spaced compression springs, end followers affording positioning means therefor and having inwardly projecting pedestals with V-shaped tapering friction surfaces between said springs, wedge shoes with faces in complementary engagement with said surfaces, a resilient pad seated against said shoes and having chamfered ends positioning said shoes, and spaced members on said pedestals abutting recessed means on said shoes.

23. In a friction energy absorbing device, a pair of spaced compression springs, opposed end followers having positioning means for said springs, and tapering V-shaped faces projecting inwardly between said springs, floating friction shoes engaging said faces, a resilient pad compressed between said shoes, and positioning means for said shoes comprising central interengaging means on said shoes and said pads.

24. In a friction energy absorbing device, spaced coil springs, identical end followers having inwardly directed pedestals with tapering faces and having positioning means for said device and for springs outwardly of said pedestals, a pair of friction shoes engaging said faces along complementary surfaces, a resilient pad compressed between said shoes, and positioning means for said shoes comprising complementary V-shaped face engagement between said pedestals and said shoes and means on said shoes engaging means on said resilient pad.

25. In a friction energy absorbing device, spaced coil springs, identical opposed end followers positioned on opposite ends of said springs and having inwardly directed pedestals projecting therebetween, V-shaped tapering friction surfaces on said pedestals, friction shoes having tapering faces engaging said surfaces, a resilient pad interposed between said shoes and having tapering ends seated against adjacent complementary portions of said shoes, and positioning means comprising central interlocking means on said shoes and said resilient pad.

26. In a friction energy absorbing device, a pair of spaced coil springs, end followers affording seats for said springs and positioning means for said device, a plurality of inwardly directed pedestals between said springs and having diagonally arranged V-shaped friction surfaces, friction shoes engaging said surfaces along complementary faces, a resilient pad abutting said shoes, and having tapered ends for positioning said shoes, interengaging means on said shoes and said resilient pad, and spaced interlocking means on said shoes and said pedestals to retain said device in assembly.

27. In a friction absorbing device, end followers each having spaced pedestals presenting V-shaped friction surfaces, compression springs interposed between said followers at opposite ends of said device, friction shoes having faces in complementary frictional engagement with said surfaces, and a rubber member under compression between said shoes and having tapered ends in abutment therewith.

28. In a friction absorbing device, end followers each having spaced pedestals presenting V-shaped friction surfaces, compression springs interposed between said followers at opposite ends of said device, friction shoes having faces in complementary frictional engagement with said surfaces, a rubber member under compression between said shoes and positioned in abutment thereagainst, and cooperating means on said surfaces and on said faces maintaining said device in assembly.

LEO A. LEHRMAN.